US008374555B2

(12) United States Patent
Hong et al.

(10) Patent No.: US 8,374,555 B2
(45) Date of Patent: Feb. 12, 2013

(54) APPARATUS AND METHOD FOR COMPENSATING THE AXIAL RATIO OF AN ANTENNA FOR TESTING RFID TAGS

(75) Inventors: Min-Kao Hong, Taichung (TW); Po-Kuang Chang, Taoyuan County (TW); Shang-Sian You, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 109 days.

(21) Appl. No.: 13/157,325

(22) Filed: Jun. 10, 2011

(65) Prior Publication Data

US 2012/0157006 A1 Jun. 21, 2012

(30) Foreign Application Priority Data

Dec. 21, 2010 (TW) ............................... 99144957 A

(51) Int. Cl.
*H04B 17/00* (2006.01)

(52) U.S. Cl. ................... 455/67.14; 455/41.1; 455/41.2; 455/575.5; 455/115.2; 455/423; 340/572.4; 340/572.7; 340/10.5; 340/514; 235/491

(58) Field of Classification Search ............... 455/67.14, 455/41.1, 41.2, 575.5, 115.2, 423
See application file for complete search history.

(56) References Cited

U.S. PATENT DOCUMENTS

| | | | | |
|---|---|---|---|---|
| 4,369,519 | A | 1/1983 | Yuuki et al. | |
| 5,187,872 | A | 2/1993 | Dufour | |
| 5,583,515 | A | 12/1996 | Marumoto | |
| 6,104,291 | A | 8/2000 | Beauvillier et al. | |
| 7,015,857 | B1 | 3/2006 | Pozgay | |
| 7,474,220 | B2 | 1/2009 | Choi et al. | |
| 7,518,519 | B2 | 4/2009 | Sullivan et al. | |
| 7,528,712 | B2 * | 5/2009 | Hong et al. | 340/514 |
| 7,973,646 | B2 * | 7/2011 | Chen et al. | 340/10.4 |
| 8,248,210 | B2 * | 8/2012 | Nikitin et al. | 340/10.1 |
| 8,279,065 | B2 * | 10/2012 | Butler et al. | 340/572.1 |
| 8,279,112 | B2 * | 10/2012 | Carrick | 342/127 |
| 8,284,055 | B2 * | 10/2012 | Butler et al. | 340/572.1 |

FOREIGN PATENT DOCUMENTS

TW 200813393 3/2008

* cited by examiner

*Primary Examiner* — Marceau Milord
(74) *Attorney, Agent, or Firm* — Jianq Chyun IP Office

(57) ABSTRACT

A method for compensating the axial ratio of an antenna for testing radio-frequency identification (RFID) tags and an apparatus using the method are provided. The method includes the following steps. An initial location of the RFID tag (or a tagged product) is set to obtain an initial vector. The RFID tag and the antenna are respectively rotated with a first axis and a second axis to detect characteristics of the RFID tag in all directions, and the first axis and the second axis are perpendicular. A polarization angle of the RFID tag is calculated according to the initial vector of the RFID tag and a location of the RFID tag after rotation. A compensation value is obtained through a look up table according to the polarization angle, so as to compensate for the axial ratio of the antenna.

22 Claims, 5 Drawing Sheets

APPARATUS AND METHOD FOR COMPENSATING THE AXIAL RATIO OF AN ANTENNA FOR TESTING RFID TAGS

CROSS-REFERENCE TO RELATED APPLICATION

This application claims the priority benefit of Taiwan application serial no. 99144957, filed Dec. 21, 2010. The entirety of the above-mentioned patent application is hereby incorporated by reference herein and made a part of this specification.

TECHNICAL FIELD

The disclosure relates to an apparatus and method for compensating the axial ratio of an antenna for testing radio-frequency identification (RFID) tags.

BACKGROUND

Generally speaking, most RFID transmitting antennas are circularly polarized while most RFID tags are linearly polarized. However, axial ratios of most commercially available mass-produced RFID antennas are normally between 2 dBm and 4 dBm. This is usually not a problem in general use. However, during the test of an RFID tag or tagged product, errors are caused by influences of the axial ratio of the reader antenna when the linearly polarized RFID tag is at different angles. The axial ratio and the gain of the reader antenna also change with frequency.

Two types of RFID test apparatuses exist, which are laboratory-scale instruments (such as instruments from HP™ and Agilent™) and general commercially available readers. The laboratory-scale instruments are too expensive for many end users, so most end users resort to commercially available readers and reader antennas to perform RFID tests. That is to say, in an existing RFID test, an existing RFID transmitting antenna is placed at an elevation angle of 0°, and an object under test rotates being placed within a distance of 1 to 2 meters in front of transmitting reader antenna. However, this test method only scans the horizontal cross section field pattern. Thus, the problem of antenna polarization is not involved during the test.

Strictly, tests of more cross-sections are required to ensure that the tagged product can be read reliably in an actual application. However, axial ratios of most commercially available RFID transmitting antennas are between about 2 dBm and 4 dBm, which are sufficient for most applications. The axial ratios of some special antennas might be between 1 dBm to 2 dBm. That is, when the object under test goes through the rotated scanning and reading, the axial ratio of the transmitting antenna corresponding to the polarization of the RFID tag may influence the measurement accuracy. Therefore, if a set of equipment may effectively correct the errors, the measurement accuracy may be greatly improved.

SUMMARY

According to an exemplary embodiment, a method for compensating the axial ratio of an antenna for testing RFID tags is introduced herein, which includes the following steps. First, an initial location and an orientation of the RFID tag are set to obtain an initial vector, in which the RFID tag is located on one side of the antenna. Next, the RFID tag is rotated with a first axis and the antenna is rotated with a second axis in sequence, in which the first axis and the second axis are perpendicular. Subsequently, a polarization angle of the RFID tag is calculated according to the initial vector of the RFID tag and a location of the RFID tag after rotation. A compensation value of the polarization angle is obtained through a look up table according to the polarization angle of the RFID tag, so as to compensate for the axial ratio of the antenna. The lookup table contains compensation values of the reader antenna for different polarizations angles.

According to an exemplary embodiment, an apparatus for compensating for an axial ratio of an antenna for testing RFID tags is introduced herein, which includes an antenna, a carrier, a reader, and a controller. The antenna is configured on a slide rail of a fixed frame. The carrier is located on one side of the antenna for bearing the RFID tag. The reader is coupled to the antenna for generating a radio wave to the RFID tag to excite the RFID tag and receive energy of the excited RFID tag. The controller is coupled to the fixed frame, the carrier, and the reader. The controller stores look up table values and receives the reply of the excited RFID tag through the reader, and at the same time calculates the axial ratio compensation of the antenna. Also, the controller is used for generating a first control signal and a second control signal to the carrier and the fixed frame, so that the carrier rotates the RFID tag with a first axis, and the fixed frame rotates the antenna with a second axis along the slide rail. A polarization angle of the RFID tag is calculated according to the initial vector of the RFID tag and a location of the RFID tag after rotation, and a compensation value is obtained through a look up table according to the polarization angle of the tag, so as to compensate for the axial ratio of the antenna. The first axis and the second axis are perpendicular.

After an initial location of the RFID tag is set, the RFID tag is rotated with a first axis and the antenna is rotated with a second axis to the location required by the test. Next, a polarization angle of the RFID tag is calculated according to the above location and a compensation value of the polarization angle is found through the look up table according to the polarization angle, so as to compensate for the axial ratio of the antenna.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
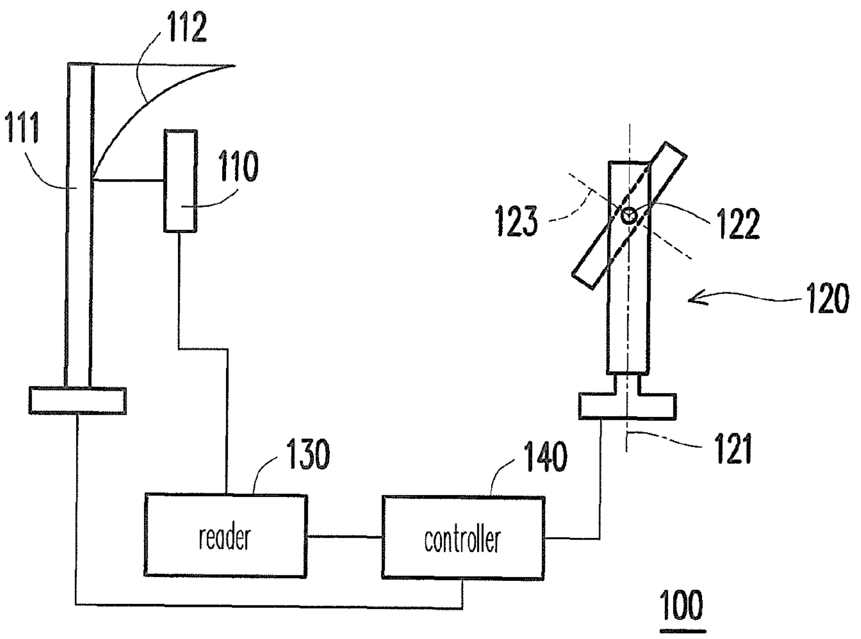
FIG. 1A is a schematic view of an apparatus for compensating the axial ratio with a look up table according to an exemplary embodiment.

FIG. 1A shows an apparatus for compensating the axial ratio of an antenna with a look up table according to an exemplary embodiment. Referring to FIG. 1A, the compensation apparatus 100 includes an antenna 110, a carrier 120, a reader 130, and a controller 140. The antenna 110 is configured on a slide rail 112 of a fixed frame 111, so that the antenna 110 can move on the slide rail 112. The antenna 110 in this exemplary embodiment is implemented by a circularly polarized antenna.

The carrier 120 is located on one side of the antenna 110 for bearing an RFID tag (not shown, for example, a reference tag). The RFID tag is typically located in antenna bore sight. The reader 130 is coupled to the antenna 110 for transmitting a radio wave by the antenna 110 to the RFID tag to excite the RFID tag and receive the radio wave returned by the RFID tag, so as to calculate a tag read power of the RFID tag and acquire a look up table value through the calculated tag read power. The controller 140 is coupled to the fixed frame 111, the carrier 120, and the reader 130. The controller 140 stores the look up table value, and the reader 130 receives the radio wave returned by the RFID tag and passes this information to the controller to obtain an axial ratio compensating value of the antenna 110. The controller 140 generates a first control signal and a second control signal to control the carrier 120 to rotate the RFID tag with a first axis 121 and control the fixed frame 111 to move the antenna 110 along the slide rail 112 with a second axis 122, or select a particular antenna in the case of multiple fixed antenna array. In addition, the controller 140 can further generate a third control signal and a fourth control signal to control the carrier 120 to rotate the RFID tag respectively with a second axis 122 and a third axis 123. The rotation around the axis 123 can also be adjusted manually.

The first axis 121 relates to azimuth angle (azimuth-wise) adjustment of the RFID tag, that is, when the carrier 120 is rotated with the first axis 121, the RFID tag can be aligned with the antenna 110. The second axis 122 relates to elevation angle (elevation-wise) adjustment of the RFID tag or antenna 110, that is, when the carrier 120 is rotated with the second axis 122 or the antenna 110 is rotated along the slide rail with the second axis 122, different elevation angles are formed between the RFID tag and the antenna 110. The third axis 123 relates to polarization angle (polarization-wise) adjustment of the RFID tag, that is, when the carrier 120 is rotated with the third axis 123, the RFID tag is presented at different polarization angles corresponding to the antenna 110.

In this exemplary embodiment, the first axis 121 is, for example, parallel to the gravity direction, and the second axis 122 is, for example, perpendicular to the gravity direction. That is, the second axis 122 is usually perpendicular to the first axis 121. In addition, for convenience of the test, during the calculation of the polarization angle, in this exemplary embodiment, instead of moving antenna 110 along the axis (not shown) of the antenna 110 to adjust the elevation angle between the antenna 110 and the RFID tag, that is, the antenna 110 moves along the slide rail 112, the controller 140 calculates the movement of the carrier 120 to rotate the RFID tag with a second axis 122 at a virtual elevation angle in the opposite direction, so the RFID tag and the antenna 110 present the elevation angle to be tested.

After the controller 140 controls the carrier 120 to rotate, the controller 140 calculates a polarization angle of the RFID tag according to the initial vector of the RFID tag and a location of the RFID tag after rotation, and finds a compensation value corresponding to the polarization angle from a look up table according to the polarization angle, so as to compensate for the axial ratio of the antenna 110. In this manner, this exemplary embodiment can effectively reduce errors caused by influences of the axial ratio of the antenna when the RFID tag is at different polarization angles.

Figure 1B:
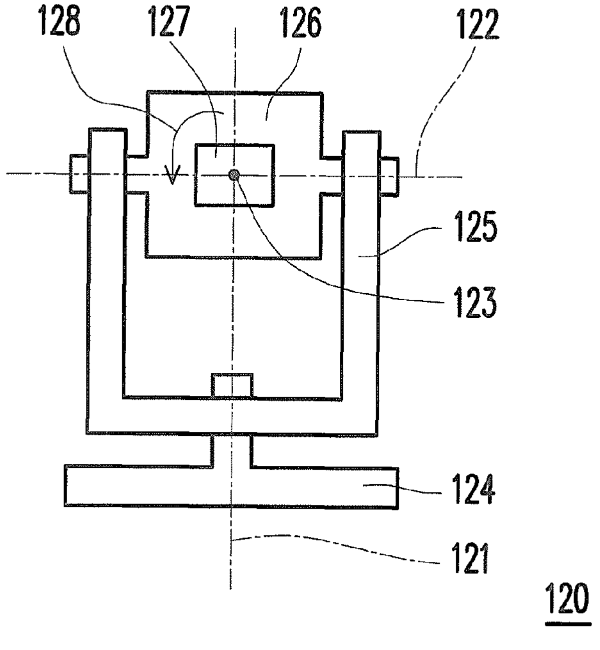
FIG. 1B is a schematic structural view of a carrier 120 in FIG. 1A used for testing the axial ratio of the transmitting reader antenna.

In addition, the carrier 120 in this exemplary embodiment can include a round base 124, a support frame 125, and a carrier board 126, as shown in FIG. 1B. The support frame 125 is pivotally disposed on the round base 124 and is rotated with the first axis 121. The carrier board 126 is pivotally disposed on the support frame 125 for bearing the RFID tag 127 and is rotated with the second axis 122. The RFID tag 127 is pivotally disposed on the carrier board 127 with the third axis 123, so as to facilitate the RFID tag 127 to rotate with the third axis.

Therefore, in this exemplary embodiment, when the support frame 125 is rotated with the first axis 121 (for example, the controller 140 generates the first control signal to the carrier 120), it indicates the azimuth angle of the rotation of the RFID tag 127. When the carrier board 126 is rotated with the second axis 122 (for example, the controller 140 generates the third control signal to the carrier 120), it indicates the elevation angle of the rotation of the RFID tag 127, that is, the elevation angle between the antenna 110 and the RFID tag 127 during the test is adjusted. When the RFID tag 127 is rotated with the third axis 123 (for example, the controller 140 generates the fourth control signal to the carrier 120), that is, rotated in the direction indicated by the arrow 128 in FIG. 1B, it indicates the polarization angle of the rotation of the RFID tag 127.

Figure 2:
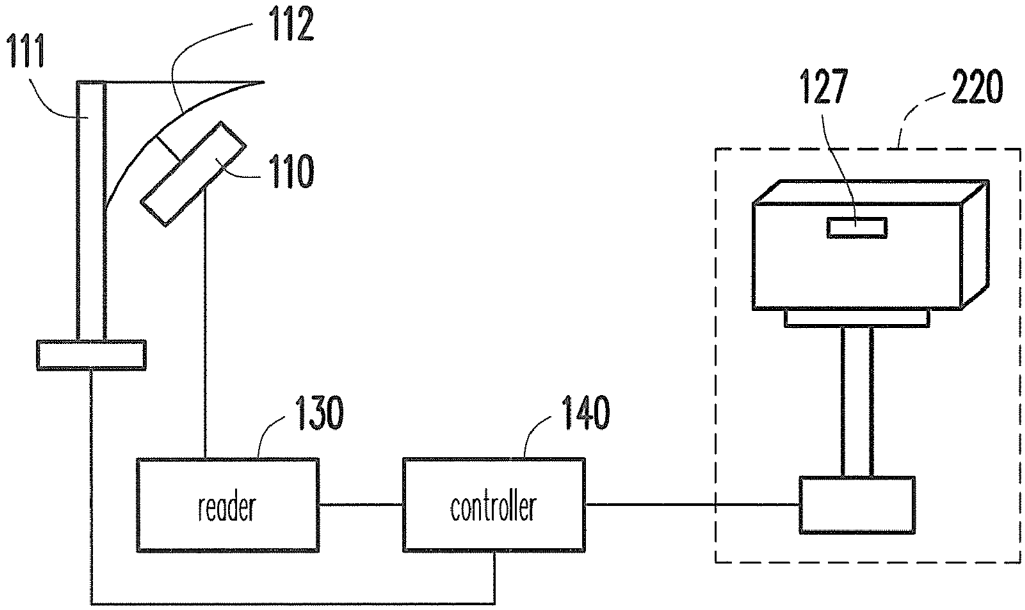
FIG. 2 is a schematic view of an apparatus for testing RFID tags and compensating for an axial ratio of an antenna according to another exemplary embodiment.

In addition, in this exemplary embodiment, during the test of an actual product (for example, the tagged product), the carrier 120 is replaced by the actual product 220, as shown in FIG. 2. The actual product 220 includes an RFID tag 127. During a test of the tagged product, the tagged product is rotated with the first axis 121 while the antenna is rotated along the elevation axis (not shown). For convenience of illustration, elements in FIG. 2 same or similar to those in FIGS. 1A and 1B are represented by the same reference numbers.

The means and functions of the compensation apparatus 100 in this exemplary embodiment are substantially illustrated as above. Next, the compensation of the axial ratio of the antenna 110 during the test for the practical product 220 is illustrated.

First, according to the polarization angle of the RFID tag 127, the user can set the initial location of the RFID tag 127. The initial location of the RFID tag 127 is based on the polarization characteristics of the tag, for example, as indicated by the spherical coordinate in the following formula (1):

$$V_{TAG0} = \begin{bmatrix} r_0 \\ \theta_0 \\ \phi_0 \end{bmatrix} \quad (1)$$

where $V_{TAG0}$ indicates the initial vector of the RFID tag 127, $r_0$ indicates the initial radial distance, $\theta_0$ indicates the initial zenith angle, and $\phi_0$ indicates the initial azimuth angle. After the initial location is set, the initial location is stored as an initial vector $V_{TAG0}$ in controller 140. Next, before the test, the controller 140 converts the spherical coordinate of the initial vector $V_{TAG0}$ into the rectangular coordinate, as indicated by the following formula (2):

$$V_{TAG} = \begin{bmatrix} x \\ y \\ z \end{bmatrix} = \begin{bmatrix} r_0\cos\theta_0\sin\phi_0 \\ r_0\sin\theta_0\sin\phi_0 \\ r_0\cos\phi_0 \end{bmatrix} = \begin{bmatrix} \cos\theta_0\sin\phi_0 \\ \sin\theta_0\sin\phi_0 \\ \cos\phi_0 \end{bmatrix} \quad (2)$$

For convenience of calculation, the value of the initial radial distance $r_0$ is set to "1" as an unit vector. Next, after the coordinate is converted, the test starts (and the tagged product is tested). Generally speaking, during the test, the RFID tag 127 is rotated at the azimuth angle, and the antenna 110 can move (for example, the antenna 110 moves on the rail 112 as shown in FIG. 2) to change the elevation angle to be tested with the RFID tag 127 (or the corresponding antenna is selected in the case of antenna array). That is to say, the controller 140 provides the first control signal to the carrier 120 to rotate the RFID tag 127, so as to locate the RFID tag 127, so the RFID tag 127 is located at the desired azimuth angle. Meanwhile, when the RFID tag 127 is rotated to the particular azimuth angle, the controller 140 calculates a current state of the RFID tag 127.

For example, when the user needs to perform the test as the RFID tag 127 is located at a particular azimuth angle, the controller 140 generates the first control signal, so as to control the support frame 125 of the carrier 120 to rotate the RFID tag 127 with the first axis 121. Meanwhile, the controller 140 calculates the rotation of the initial vector $V_{TAG0}$ to the same azimuth angle through the rotation matrix (as indicated by the following formula (3)), as indicated by the following formula (4):

$$R_Z(\theta_{RZ}) = \begin{bmatrix} \cos\theta_{RZ} & -\sin\theta_{RZ} & 0 \\ \sin\theta_{RZ} & \cos\theta_{RZ} & 0 \\ 0 & 0 & 1 \end{bmatrix} \quad (3)$$

$$V|_{TAG}^{RZ} = R_Z(\theta_{RZ})V_{TAG} \quad (4)$$

where $R_Z(\theta_{RZ})$ is the rotation matrix when the RFID tag 127 is rotated by the azimuth angle, and $V|_{TAG}^{RZ}$ is the resulting vector of the initial vector $V_{TAG0}$ (that is, the tag on the product) after rotation of the azimuth angle. During the test, for example, the controller 140 generates the second control signal to the fixed frame 111 to drive the motor (not shown) connected to the fixed frame 111, thereby controlling the antenna 110 to move (rotate) along the slide rail 112, so that the RFID tag 127 can also be tested at different elevation angles (a different antenna is selected in the case of antenna array setup). In order to maintain the original coordinate, in this exemplary embodiment, when the antenna 110 moves to different elevation angles, the controller 140 does not calculate the moving state of the antenna 110. Instead, for simplicity, the initial vector $V|_{TAG}^{RZ}$ rotates at a virtual elevation angle in the opposite direction, which represents the elevation angle generated by the antenna 110 after moving. That is to say, the controller 140 generates the third control signal to the carrier 120, and the carrier 120 rotates the RFID tag 127 with the second axis 122 at the virtual elevation angle in the opposite direction. Equivalently, the RFID tag 127 and the antenna 110 are presented in an elevation angle to be tested. Meanwhile, the controller 140 calculates the rotated initial vector $V_{TAG0}$ to the corresponding negative elevation angle through another rotation matrix (for example, the following formula (5)):

$$V|_{TAG}^{RY} = R_Y(\phi_{RY})V_{TAG} \quad (5)$$

$$R_Y = \begin{bmatrix} \cos\phi_{RY} & 0 & \sin\phi_{RY} \\ 0 & 1 & 0 \\ -\sin\phi_{RY} & 0 & \cos\phi_{RY} \end{bmatrix} \quad (6)$$

where $R_Z(\theta_{RZ})$ is the rotation matrix for the elevation angle of the rotation and $V|_{TAG}^{RY}$ is the coordinate of the elevation angle for the rotation of the RFID tag 127.

Subsequently, the coordinate of the vector $V_{TAG0}$ after rotation recorded in the controller 140 is consistent with the RFID tag 127 (or for example, the practical product that is tagged). Therefore, the vector $V|_{TAG}^{RY}$ after rotation can be projected directly to the antenna 110 along the x axis (that is, the third axis 123), that is, the coordinate of the vector $V_{TAG0}$ is converted by using the conversion matrix of formula (8) to acquire the projected coordinate, as indicated by the following formula (9):

$$P_{YZ} = \begin{bmatrix} 0 & 0 & 0 \\ 0 & 1 & 0 \\ 0 & 0 & 1 \end{bmatrix} \quad (8)$$

$$V|_{TAG}^{PYZ} = P_{YZ}V_{TAG} \quad (9)$$

where $P_{YZ}$ is the conversion matrix of the RFID tag after being projected to the antenna and $V|_{TAG}^{PYZ}$ is the vector of the projected RFID tag. Since the coordinate of the antenna 110 is displaced for one x axis from the coordinate of the RFID tag 127, so the vector in the x axis direction can be set to 0 by projection (8). Next, the formula (10) is obtained through calculation according to formula (9). Subsequently, the length and angle of the vector $V|_{TAG}^{PYZ}$ are respectively calculated according to the calculated formula (10) and through the formulas (11) and (12), and the angle is the polarization angle of the RFID tag 127, $$V|_{TAG}^{PYZ} = \begin{bmatrix} 0 \\ a \\ b \end{bmatrix} \quad (10)$$

$$r_p = \sqrt{a^2 + b^2} \quad (11)$$

$$\rho_P = \begin{cases} \cos^{-1}(a/r_p) \\ 2\pi - \cos^{-1}(a/r_p) \end{cases} \text{if } \begin{cases} b \geq 0; \\ b < 0; \end{cases} \quad (12)$$

where $V|_{TAG}^{PYZ}$ is the vector of the RFID tag after being projected to the antenna, $r_p$ is the length, and $\rho_P$ is a polarization angle of the RFID tag.

After obtaining the polarization angle, the controller 140 can find a compensation value corresponding to the calculated polarization angle according to the calculated polarization angle of the RFID tag 127 and the look up table value stored therein. The controller 140 can add the compensation value (for example, the previously calculated compensation value) into tag turn on power as tested, as indicated by the formula (13):

$$TTOP_{ARC}(f_i,\rho_p)=TTOP(f_i,\rho_p)-G_{ARC}(\rho_p,f_i) \quad (13)$$

where $TTOP_{ARC}(f_i,\rho_p)$ is the axial ratio of the antenna after compensation, $TTOP(f_i, \rho_p)$ is the tag turn on power before compensation, $G_{ARC}(\rho_p, f_i)$ is the compensation value. In this manner, this exemplary embodiment can compensate the axial ratio of the antenna 110 when the RFID tag 127 is located at every angle, so as to effectively reduce errors caused by influences of the axial ratio of the antenna 110 when the RFID tag 127 is at different polarization angles. For example, when the controller 140 tests that the tag turn on power of the RFID tag 127 is TTOP ($\rho_p$,f(i))=−13.3 dBm, the controller 140 can add the previously calculated compensation value (for example, 0.5 dBm) to obtain $TTOP_{ARC}(f_i, \rho_p)$=−13.3 dBm−0.5=−13.8 dBm. It can be seen that the antenna 110 has a lower gain when the polarization angle of the RFID tag 127 is 15° and the RFID tag 127 apparently needs a higher tag turn on power, so to obtain the real tag turn on power of the RFID tag 127, the previously calculated compensation value needs to be added.

As the antenna 110 in this exemplary embodiment is implemented by the circularly polarized antenna, the performance of the circularly polarized antenna needs to be measured by establishing the compensation lookup table. Therefore, the operation of establishing the look up table with the compensation apparatus 100 in this exemplary embodiment is illustrated here and the carrier 120 in FIG. 1B is used for this purpose. First, the controller 140 provides the first control signal to control the support frame 125 of the carrier 120 to rotate the RFID tag 127 with the first axis 121, so that the RFID tag 127 is aligned with the antenna 110. Next, the controller 140 provides the third control signal to control the carrier board 126 of the carrier 120 to rotate the RFID tag 127 with the second axis 122, so that the RFID tag 127 is rotated to an elevation angle (for example, the elevation angle between the antenna 110 and the RFID tag 127 is 0°). The controller 140 provides the fourth control signal to control the motor (not shown, but a distance is required) connected to the carrier board 126 of the carrier 120 to rotate the RFID tag 127 with the third axis 123, so that the RFID tag 127 is rotated to an initial angle (that is, the polarization angle of the RFID tag 127 is 0°).

Subsequently, the controller 140 controls the output power of the reader 130 and instructs the reader 130 to try to read the RFID tag 127. That is to say, the reader 130 transmits the radio wave to the RFID tag 127 through the antenna 110 to excite the RFID tag 127 (that is, excite a circuit inside the RFID tag 127), and the antenna 110 receives the energy of the excited RFID tag 127 and transmits the energy to the reader 130. Next, the controller 140 receives the energy of the excited RFID tag 127 through the reader 130, by adjusting the output of the reader 130 at different values. Then, the controller 140 determines the amount of the reader output power that just turns on the tag, that is, the first tag read power, which is at zero polarization angle, for example, 12.5 dBm. In other words, the tag read power is the least amount of power required by the reader to turn on the tag and read it.

Next, the controller 140 provides the fourth control signal to control the motor (not shown) connected to the carrier board 126 of the carrier 120 to rotate the RFID tag 127 with the third axis 123, so that the RFID tag 127 is rotated to the test angle (that is, the polarization angle of the RFID tag 127 is adjusted to, for example, 15°). At this time, the reader 130 transmits the radio wave to the RFID tag 127 by the antenna 110 to excite the RFID tag 127 and the antenna 110 receives the energy of the excited RFID tag 127 and transmits the energy to the reader 130. Next, the controller 140 receives the energy of the excited RFID tag 127 through the reader 130, by adjusting the output of the reader 130 at different values. Then, the controller 140 determines the amount of the reader output power that just turns on the tag, that is, the second tag read power at the test polarization angle, for example, 12.0 dBm.

Next, the controller 140 calculates the difference between the obtained first tag read power and the obtained second tag read power and records the difference. That is to say, the controller 140 makes 12.5 dBm (the first tag read power)−12 dBm (the second tag read power)=+0.5 dBm (that is, when the polarization angle of the RFID tag 127 is 15°, the difference of the gain of the antenna 110 is +0.5 dBm), as indicated by the following formulas (14):

$$G_{ARC}(\rho_p,f(i))=G(\rho_p,f(i))-G(\rho_{POL\text{-}CAL},f(i)) \quad (14)$$

where $G(\rho_p, f(i))$ is the tag read power or gain of the antenna 110 (one having a direct relationship with the gain of the antenna 110 of the reader 130 and the RFID tag 127) when the RFID tag 127 is located at a certain polarization angle, $G(\rho_{POL\text{-}CAL}, f(i))$ is the tag read power or gain of the antenna 110 when the polarization angle of the RFID tag 127 is 0°, $G_{ARC}(\rho_p, f(i))$ is the difference of the tag read power of the antenna 110 when the RFID tag 127 is located at a certain polarization angle and the polarization angle of 0°.

For example, $\rho_p$ is 15° (the polarization angle of the RFID tag 127), f(i) is 915 MHz, and it is assumed that $G(\rho_p$=15°, f(i)=915 MHz))=12.5 dBm is recorded in the look up table and $G(\rho_{POL\text{-}CAL}$=0°, f(i)=200 MHz))=12.0 dBm, so $G_{ARC}$ (ρ=15°, f(i)=200 MHz))=$G(\rho_p$=15°, f(i)=200 MHz))−G ($\rho_{POL\text{-}CAL}$=15°, f(i)=200 MHz))=12.5−12.0=0.5 dBm. It can be seen that when the polarization angle of the RFID tag 127 is 15°, the antenna 110 needs a higher power to turn on the RFID tag 127, due to the fact that antenna 110 has a lower gain at this polarization angle.

After the difference $G_{ARC}$ of the antenna 110 when the polarization angle of the RFID tag 127 is 15° and the polarization angle of the RFID tag 127 is 0° is calculated, the controller 140 is ready to test for the $G_{ARC}$ at the next polarization angle (for example 30°). The controller 140 provides the fourth control signal again to control the motor (not shown) on the carrier board 126 of the carrier 120 and rotate the RFID tag 127 with the third axis 123 to the initial angle (that is, the polarization angle of 0°), so as to acquire the first tag read power (for example, 12.0 dBm) of the RFID tag 127 at the initial angle again. Next, the controller 140 provides the fourth control signal to control the motor (not shown) on the carrier board 126 of the carrier 120 to rotate the RFID tag 127 to the test angle (that is, the polarization angle of the RFID tag 127 is adjusted to 30°), so as to acquire the second tag read power (for example, 12.7 dBm) of the RFID tag 127 at the test angle. Subsequently, the controller 140 can calculate the difference (that is, −0.7 dBm) when the polarization angle of the RFID tag 127 is 30° and the polarization angle of the RFID tag 127 is 0° and record the difference $G_{ARC}$.

Subsequently, the controller 140 can provide the fourth signal to rotate the RFID tag 127 to the initial angle to obtain the first tag read power, and then rotate the RFID tag 127 to the test angle to obtain the second tag read power, thereby calculating the difference of the tag read power of the test angle. Next, the above process is repeated for all polarization angles from 0 to 360 degrees. After calculating the difference between the tag read power of the antenna 110 when the RFID tag 127 is located at each test angle and when the RFID tag 127 is located at the initial angle, the controller 140 stores all the polarization angles, frequencies, differences (that is, compensation values) to establish the look up table values required for compensation of the axial ratio of the antenna 110.

It is noted that the tag read power at the initial angle (zero degree polarization angle) is re-measured before each tag read power at the test angle is measured for reasons described below. The controller 140 can employ techniques that minimizes errors caused by output drifts when using commercial readers, and the techniques includes: (a) resetting the thermal drift by re-measuring the first tag read power at each polarization angle, and or (b) warming up briefly at intended power before performing actual tag read power to avoid the initial output drift which is much steeper, or (c) reducing thermal fluctuation during the measurement period, by either very low reader power output (reading tags) duty cycle or by maintaining a certain constant reader output that matches closely to the intended operating all the time. The exact technical details of the above techniques can be adjusted to suit a particular model of commercial reader.

In addition, as the reader 130 is, for example, a general RFID reader, energy of a wireless signal output by the reader 130 changes with a temperature of a chip inside the reader 130. In order to reduce errors caused by changes of the temperature during measurement of the axial ratio of the antenna, the reader 130 turned off for a preset time each time after outputting the wireless signal for testing the tag read power to keep the temperature of the reader 130 low and stable. Next, the reader 130 outputs the radio wave again, so as to perform a next test of the axial ratio of the antenna. Therefore, the influences caused by the temperature on the energy of the radio wave generated by the reader 130 can be effectively reduced. Before measuring the tag read power, the reader 130 performs an initial measurement first. The reader 130 outputs a continuous wave at the tag read power for a short period. The continuous wave brings up the temperature of the internal components of the reader 130 closer to the expected equilibrium temperature point and then the reader 130 immediately measures the tag read power. Together with the previous countermeasure, the procedure described above greatly improves repeatability, which is critical to the measurement of the axial ratio of the reader antenna using only a tag and a commercial reader. Proper adjustment of the two timings can result in good repeatability in the sub dB region, even good enough to compensate for the antennas that having good axial ratio, for example, 1 dB.

When two different labs test the same tag using different equipments, the results are expected to be almost identical. Here, two antennas (antennas A and B) having different axial ratios are employed to perform the test on one RFID tag in this exemplary embodiment. One of them has an axial ratio under 1 dB in specification. The axial ratio compensation method proposed here predicts the test result of the two different antennas will be the same regardless of their axial ratio characteristics. The RFID tag to be tested is rotated by 360° and the antenna is fixed at the elevation angle of 67.5°, and the test results are as shown in FIG. 3.

Figure 3:
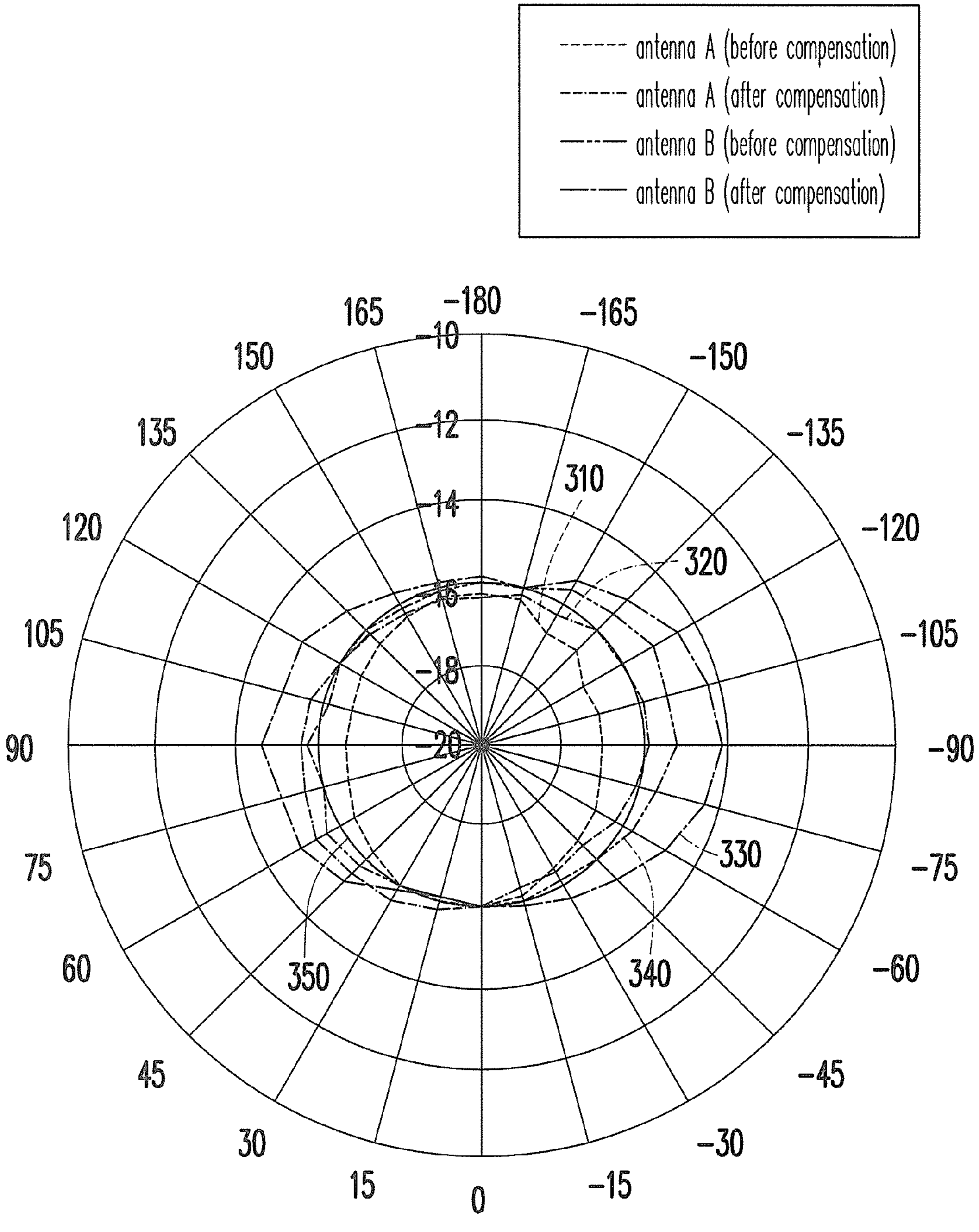
FIG. 3 is a corresponding relationship diagram of tag using two different antennas before and after compensation, according to an actual result of testing an RFID tag where the reader antenna is elevated to 67.5 degrees above the horizon.

FIG. 3 is a corresponding relationship diagram of the tag turn on power pattern of the RFID tag using two different antennas under test before and after compensation according to an exemplary embodiment. Referring to FIG. 3, curve 310 is the pattern of the RFID tag before the antenna A is compensated, a curve 320 is the pattern of the RFID tag tested by the same antenna A with axial ratio compensation. Curve 330 is the pattern of the same RFID tag tested with antenna B without axial ratio compensation. Curve 340 is the pattern of the same tag tested with antenna B with axial ratio compensation.

It can be seen from FIG. 3 that before the antenna A and antenna B are compensated by the compensation apparatus 100 in this exemplary embodiment, the tag turn on power pattern of the RFID tag using two different antennas are curve 310 and curve 330 respectively. From the comparison between the curve 310 and the curve 330, the significant difference is caused by the problem of the axial ratio, so before the antenna A and the antenna B are compensated, the axial ratios of the antennas introduce large errors. However, after the antenna A and the antenna B are compensated by the compensation apparatus 100 in this exemplary embodiment, the tag turn on power pattern of the RFID tags are shown respectively by the curve 320 and the curve 340. From the comparison between the curve 320 and the curve 340, the difference between the tag turn on power pattern is substantially smaller. Therefore, after the antenna A and the antenna B are compensated, both the magnitude and profile become closely matched with each other. In this manner, the apparatus for compensating for an axial ratio of an antenna 100 in this exemplary embodiment can effectively reduce the error caused by influences of the axial ratio of the antenna when the RFID tag is tested at different azimuth and elevation angles and the expectation of the same results by different antennas is demonstrated thereby.

Figure 4:
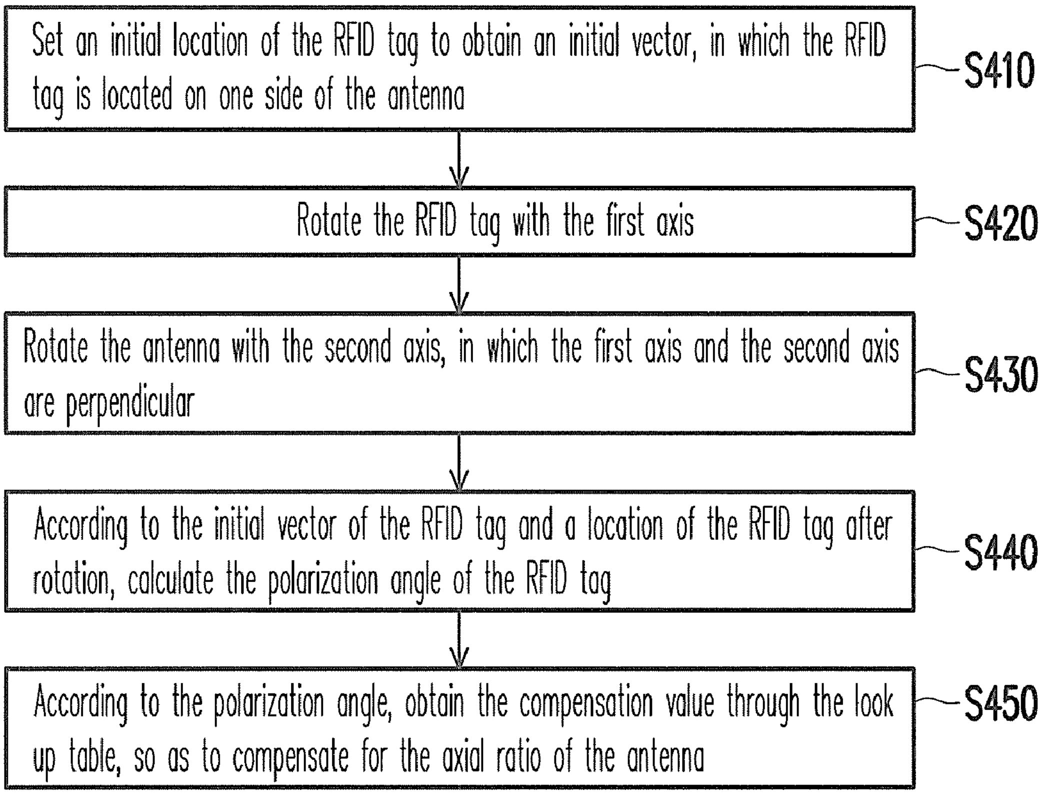
FIG. 4 is a flowchart of a method for compensating for an axial ratio of an antenna according to an exemplary embodiment.

The method for compensating for an axial ratio of an antenna and the method for establishing a look up table can be concluded from the above illustration of the embodiments. FIG. 4 is a flowchart of a method for compensating for an axial ratio of an antenna during the testing of RFID tags according to an exemplary embodiment. The antenna in this embodiment is, for example, implemented by the circularly polarized antenna. Referring to FIG. 4, in Step S410, the initial location of the RFID tag is set to obtain the initial vector. In Step S420, the RFID tag is rotated with the first axis (for example, the z axis) (that is, an azimuth angle of the RFID tag is rotated). In Step S430, the antenna is rotated with the second axis (for example, the y axis) (that is, rotation with the elevation angle between the rotated RFID tag and the antenna), in which the first axis and the second axis are perpendicular (for example, the first axis is parallel to the gravity direction and the second axis is perpendicular to the gravity direction).

Next, in Step S440, according to the initial vector of the RFID tag and a location of the RFID tag after rotation, the polarization angle between the antenna and the RFID tag is calculated. Subsequently, in Step S450, according to the polarization angle, the compensation value is obtained through the look up table, so as to compensate for the axial ratio of the antenna during the testing of the RFID tag. In this manner, this exemplary embodiment can compensate for the axial ratio of the antenna when the RFID tag is at each polarization angle, so as to effectively reduce errors caused by influences of the axial ratio of the antenna when the RFID tag is at different polarization angles.

The method to obtain the lookup table with sufficient precision using only commercial tags and readers is also presented. Although the look up table can be created easily with instrument grade signal generator and power meter, most end users do not normally posses such equipment.

Figure 5:
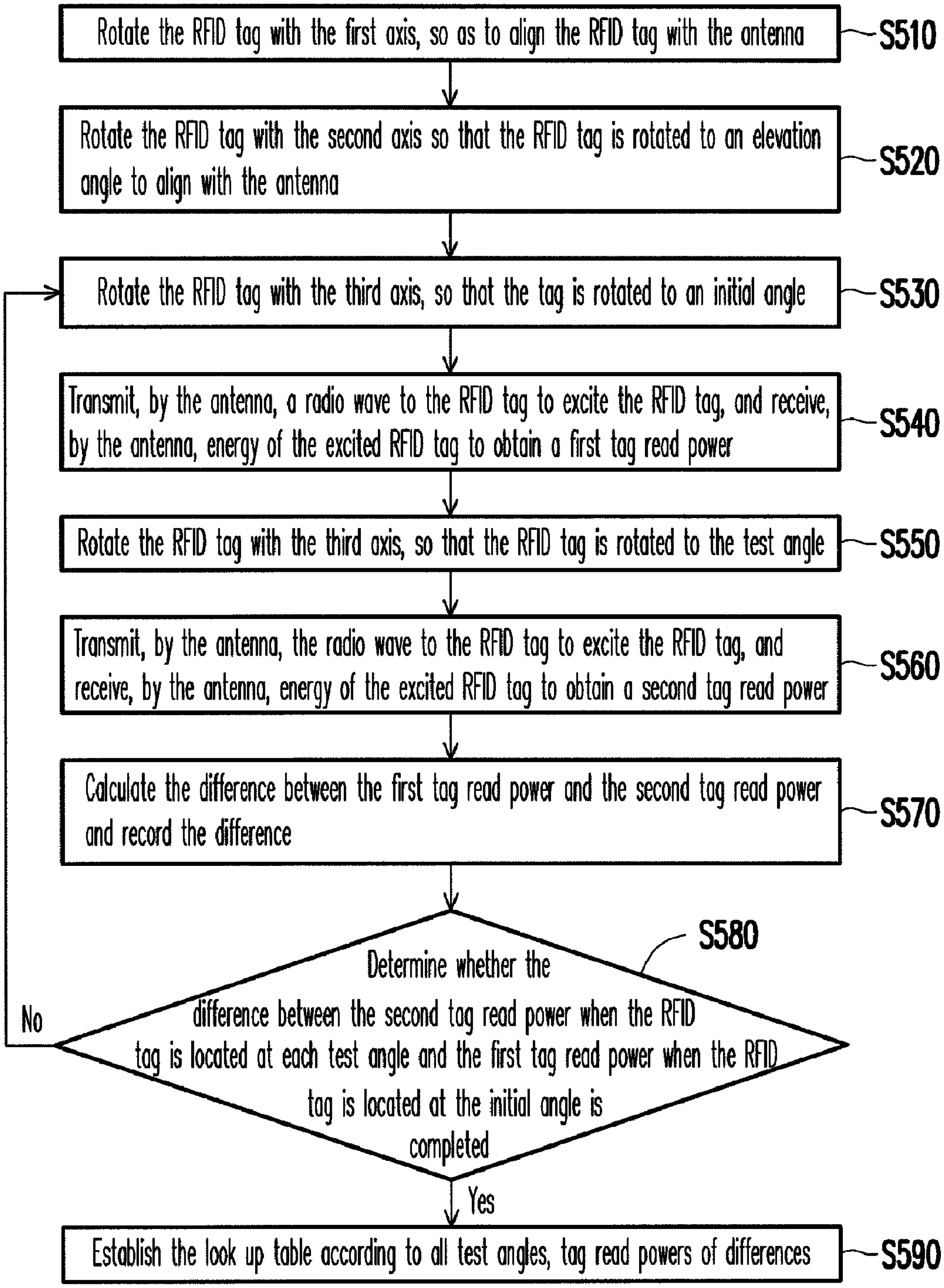
FIG. 5 is a flowchart of establishing a look up table according to an exemplary embodiment.

FIG. 5 is a flowchart of establishing a look up table according to an exemplary embodiment. Referring to FIG. 5, in Step S510, the RFID tag is rotated with the first axis (for example, the z axis), so as to align the RFID tag with the antenna. Next, in Step S520, the RFID tag is rotated with the second axis (for example, the y axis), so that the RFID tag is at the particular elevation angle, such that the antenna and the RFID tag present the elevation angle of 0°. In Step S530, the RFID tag is rotated with the third axis (axis 123), so that the RFID tag is located at the initial angle, for example, the RFID tag is located at the polarization angle of 0°.

Subsequently, in Step S540, the antenna transmits a radio wave to the RFID tag to excite the RFID tag (that is, excite the circuit inside the RFID tag), and the antenna receives the energy of the excited RFID tag to obtain a first tag read power. Next, in Step S550, the RFID tag is rotated with the third axis, so that the RFID tag is rotated to the test angle (that is, the polarization angle of the RFID tag is adjusted).

In Step S560, the antenna transmits the radio wave to the RFID tag to excite the RFID tag, and the antenna receives the energy of the excited RFID tag to obtain a second tag read power. In Step S570, the difference between the first tag read power and the second tag read power is calculated and the difference is recorded, that is the required compensation value is calculated in this exemplary embodiment. Subsequently, the process turns to Step S580 to determine whether the difference between the second tag read power when the RFID tag is located at each test angle and the first tag read power when the RFID tag is located at the initial angle is completed.

If the determination result is no, it indicates the calculation of all the differences at each angle is not completed, and the process returns to Step S530 to continue the test of the axial ratio of each test angle (that is, the polarization angle) and the calculation of the difference between the second tag read power of each test angle and the first axial ratio of the initial angle until the calculation of all the differences is completed. In Step S590, the look up table required for compensation of the axial ratio of the antenna is established according to all test angles, frequencies, and differences.

In view of the above, in the exemplary embodiments, after the initial location of the RFID tag is set, the RFID tag is rotated with the first axis and the antenna is rotated with the second axis (or the RFID tag is rotated with the second axis at a virtual elevation angle in an opposite direction) to the location to be tested. Next, according to the above location, the polarization angle of the RFID tag is calculated, and the compensation value corresponding to the polarization angle is found through the look up table according to the above polarization angle, so as to compensate for the axial ratio of the antenna. Also, before the compensation of the axial ratio of the antenna, the look up table is first established. In this manner, the error caused by influences of the axial ratio of the antenna at different angles is reduced.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for compensating the axial ratio of an antenna for testing radio-frequency identification (RFID) tags, comprising:

setting an initial location and an orientation of the RFID tag to obtain an initial vector, wherein the tag is located on one side of the antenna;

rotating the RFID tag with a first axis;

rotating the antenna with a second axis, wherein the first axis and the second axis are perpendicular;

calculating a polarization angle of the RFID tag according to the initial vector of the RFID tag and a location of the RFID tag after rotation; and obtaining a compensation value through a look up table according to the polarization angle, so as to compensate the axial ratio of the antenna.

2. The method for compensating the axial ratio of an antenna for testing RFID tags of claim 1, wherein the first axis is parallel to the gravity direction.

3. The method for compensating the axial ratio of an antenna for testing RFID tags of claim 2, wherein the antenna is a circularly polarized antenna.

4. The method for compensating the axial ratio of an antenna for testing RFID tags of claim 1, wherein a step of establishing the look up table comprises:

rotating the RFID tag with the first axis, so as to align the RFID tag with the antenna;

rotating the RFID tag with the second axis, so as to rotate the RFID tag to an elevation angle to align with the antenna;

rotating the RFID tag with a third axis, so as to rotate the RFID tag to an initial angle, wherein the third axis is pointed directly to the antenna;

transmitting, by the antenna, a radio wave to the RFID tag to excite the RFID tag, and receiving, by the antenna, energy of the excited RFID tag to obtain a first tag read power.

5. The method for compensating the axial ratio of an antenna for testing RFID tags of claim 4, wherein the step of establishing the look up table further comprises:

rotating the RFID tag with the third axis, so as to rotate the RFID tag to a test angle;

transmitting, by the antenna, the radio wave to the RFID tag to excite the RFID tag, and receiving, by the antenna, energy of the excited tag to obtain a second tag read power.

6. The method for compensating the axial ratio of an antenna for testing RFID tags of claim 5, wherein the step of establishing the look up table further comprises:

calculating a difference between the first tag read power and the second tag read power and recording the difference;

determining whether the difference between the second tag read power when the RFID tag is located at each test angle and the first tag read power when the RFID tag is located at the initial angle is completed.

7. The method for compensating the axial ratio of an antenna for testing RFID tags of claim 6, wherein the step of establishing the look up table further comprises:

when the determination result is no, returning to the step of rotating the RFID tag with the third axis so the RFID tag is located at the initial angle; and when the determination result is yes, establishing the look up table according to all the test angles, the tag read powers of all the antennas, and all the differences between the tag read powers.

8. An apparatus for compensating the axial ratio of an antenna, comprising:

an antenna, configured on a slide rail of a fixed frame;

a carrier, located on one side of the antenna for bearing a radio-frequency identification (RFID) tag;

a reader, coupled to the antenna for generating a radio wave to the RFID tag to excite the RFID tag and receive energy of the excited RFID tag; and a controller, coupled to the fixed frame, the carrier, and the reader, wherein the controller stores a look up table and receives reply of the excited RFID tag through the reader, and meanwhile calculates an axial ratio of the antenna and generates a first control signal and a second control signal to the carrier and the fixed frame, so that the carrier rotates the RFID tag with a first axis, and the fixed frame rotates the antenna with a second axis along the slide rail to calculate a polarization angle of the RFID tag according to an initial vector of the RFID tag and a location of the RFID tag after rotation and obtain a compensation value through the look up table according to the polarization angle, so as to compensate for an axial ratio of the antenna, wherein the first axis and the second axis are perpendicular.

9. The apparatus for compensating for the axial ratio of an antenna of claim 8, wherein the carrier comprises:

a round base; and a support frame, pivotally disposed on the round base and rotating with the first axis.

10. The apparatus for compensating for the axial ratio of an antenna of claim 9, wherein the carrier further comprises:

a carrier board, pivotally disposed on the support frame for bearing the RFID tag and rotating with the second axis, wherein the RFID tag is pivotally disposed on the carrier board with a third axis.

11. The apparatus for compensating the axial ratio of an antenna of claim 10, wherein:

the controller provides the first control signal to enable the carrier to rotate the RFID tag with the first axis and enable the RFID tag to be aligned with the antenna;

the controller provides a third control signal to enable the carrier to rotate the RFID tag with the second axis and rotate the RFID tag to a particular elevation angle;

the controller provides a fourth control signal to enable the carrier to rotate the RFID tag with the third axis and rotate the RFID tag to an initial angle;

the reader transmits a radio wave to the RFID tag through the antenna to excite the RFID tag and receives energy of the excited RFID tag through the antenna; and the controller receives the energy of the excited RFID tag through the reader to obtain a first tag read power.

12. The apparatus for compensating the axial ratio of an antenna of claim 11, wherein:

the controller further provides the fourth control signal to enable the carrier to rotate the RFID tag with the third axis and rotate the RFID tag to a test angle; and the reader transmits the radio wave to the RFID tag to excite the RFID tag, the antenna receives energy of the excited RFID tag, and the controller receives the energy of the excited RFID tag through the reader to obtain a second tag read power.

13. The apparatus for compensating the axial ratio of an antenna of claim 12, wherein the controller further calculates a difference between the first tag read power and the second tag read power and records the difference.

14. The apparatus for compensating the axial ratio of an antenna of claim 13, wherein the controller then provides the fourth control signal in sequence to enable the carrier to rotate the RFID tag at a plurality of different angles until a difference between the second tag read power when the RFID tag is located at each test angle and the first tag read power when the RFID tag is located at the initial angle is completed, and the controller records the differences, so as to generate the look up table and store the look up table in the controller.

15. The apparatus for compensating the axial ratio of an antenna of claim 14, wherein the controller generates the look up table according to all the test angles, the tag read powers of all the antennas, and all the differences between the tag read powers.

16. The apparatus for compensating the axial ratio of an antenna of claim 15, wherein the controller employ a technique to minimizes errors caused by output drifts when the reader is a commercial reader, and the technique includes resetting the thermal drift by re-measuring the first tag read power at each polarization angle.

17. The apparatus for compensating the axial ratio of an antenna of claim 16, wherein the controller employ a technique to minimizes errors caused by output drifts when the reader is a commercial reader, wherein the technique includes:

the controller resets the thermal drift by re-measuring the first tag read power at each polarization angle.

18. The apparatus for compensating the axial ratio of an antenna of claim 16, wherein the technique further includes:

the controller warms up at intended power before performing actual tag read power to avoid the initial output drift which is much steeper.

19. The apparatus for compensating the axial ratio of an antenna of claim 16, wherein the technique further includes:

the controller reduces the thermal fluctuation during the measurement period, by either very low reader power output duty cycle or by maintaining a certain constant reader output that matches closely to the intended reader power output.

20. The apparatus for compensating the axial ratio of an antenna of claim 19, wherein the very low reader power output duty cycle is for reading the RFID tag.

21. The apparatus for compensating the axial ratio of an antenna of claim 9, wherein the first axis is parallel to the gravity direction.

22. The apparatus for compensating the axial ratio of an antenna of claim 10, wherein the third axis is pointed directly to the antenna.

* * * * *